United States Patent [19]

Robinson

[11] Patent Number: 4,519,987

[45] Date of Patent: May 28, 1985

[54] TREATMENT OF OXIDIC MATERIALS

[75] Inventor: Michael Robinson, Wooton, England

[73] Assignee: Laporte Industries Limited, London, England

[21] Appl. No.: 531,265

[22] Filed: Sep. 12, 1983

[30] Foreign Application Priority Data

Oct. 9, 1982 [GB] United Kingdom ............... 8228932
Jan. 8, 1983 [GB] United Kingdom ............... 8300473

[51] Int. Cl.$^3$ ..................... C01G 41/00; C01G 33/00; C01G 35/00; C01F 7/56
[52] U.S. Cl. ........................................ 423/60; 423/59; 423/44; 423/62; 423/133; 423/135; 423/136; 423/DIG. 16
[58] Field of Search .................. 423/75, DIG. 16, 59, 423/60, 62, 133, 44, 135, 136

[56] References Cited

U.S. PATENT DOCUMENTS

| | | | |
|---|---|---|---|
| 2,184,884 | 12/1939 | Muskat et al. | 423/75 |
| 2,852,362 | 9/1958 | Daubenspeck et al. | 423/75 |
| 2,933,373 | 4/1960 | Love et al. | 423/75 |
| 3,803,287 | 4/1974 | Fukushima et al. | 423/75 |
| 3,870,506 | 3/1975 | Robinson et al. | 423/75 |

FOREIGN PATENT DOCUMENTS 34434 8/1981 European Pat. Off. ............ 423/133

Primary Examiner—H. T. Carter
Attorney, Agent, or Firm—Kane, Dalsimer, Kane, Sullivan and Kurucz

[57] ABSTRACT

In the fluidized bed chlorination of oxidic materials, for example minerals such as bauxite, tantalite, columbite, wolframite or scheelite, the separation of metal values giving vaporous chlorides at the reaction temperature is enhanced by maintaining a zone substantially free of chlorine in the fluidized bed, for example a zone at least 0.25 m in depth measured from the expanded bed surface. A high aspect ratio bed and counter current movement of the bed matter and the chlorine within the bed are preferably used.

8 Claims, No Drawings

TREATMENT OF OXIDIC MATERIALS

BACKGROUND OF THE INVENTION

1. Field of the Invention

This invention relates to the treatment of oxidic materials to remove selectively one or more constituents thereof by a chlorination process.

2. Brief Description of the Prior Art

More particular, a fluidised bed chlorination process is envisaged the oxidic materials to be treated usually being a mineral such as an ore, a treated ore, a clay or the like in a particulate form suitable for fluidisation.

One branch of the art of fluidised bed chlorination is that in which an oxidic material is treated with diluted chlorine in the presence of an excess of carbon. In such a process the selectivity of the chlorination is controlled by the dilution of the chlorine, the carbon purposely being removed as a controlling factor by its use in excess over the quantity of oxygen added to the bed, if any, or present in the chlorinatable constituents of the oxidic material in the bed and the temperature may be controlled, if required, by adding a small proportion of oxygen to the bed or by external means of various kinds such as the preheating of the oxidic material.

Such a process as is last described was disclosed in British Pat. No. 1359882 in relation to the beneficiation of an ore containing titanium and iron oxides. Later, in European Patent Publication No. 0034434 a similar type of process was disclosed in relation to the separation of iron and iron chlorides from an oxidic material to leave behind a bed product beneficiated with respect to its content of a desired metal oxide or oxides other than iron and also in relation to the removal of one or more metals other than iron in the form of chlorides, for example, one or more of boron, gallium, zirconium, thorium, aluminium, titanium, silicon or uranium, from an oxidic material either to recover them as desired metals from a residual bed rich in iron oxides or to beneficiate the oxidic material with respect to its content of yet a different metal oxide.

In each aspect of the process disclosed in European Patent Publication No. 0034434 the Gibbs free energy of chlorination of the oxide which is desired to remain in the bed product, is less negative than that removed as chloride from the bed, preferably, though not essentially, at least 10 kilocalories ($=10\times 4184$ Joules) per mole of chlorine employed less negative.

Reference is made to "The thermochemical properties of the oxides, fluorides and chlorides to 2500° K." by A. Glassner, published by the Argonne National Laboratory, which describes the Gibbs Free Energy of chlorination of metal oxides.

While the type of process discussed above, referred to for brevity as the "dilute chlorine" process can give excellent selectivity of chlorination under some circumstances it is inevitable that a small proportion of the material which it is desired to remove will remain in the bed and contaminate the product drawn from the bed. This effect may be more marked in relation to certain more difficult metal separations, for example in relation to the separation of iron and aluminium values, which is notoriously difficult as is acknowledged in Canadian Pat. No. 488695.

In fluidised bed chlorination processes, generally, it has been desired to minimise chlorine wastage resulting from chlorine slip through the bed by endeavouring to achieve substantially complete utilisation of the chlorine by the time the bed gases reach the upper surface of the bed. Conversely, however, it has been desired to maximise the capacity of the fluidised bed equipment by ensuring that free chlorine is available for reaction in substantially the whole of the bed volume.

SUMMARY OF THE INVENTION

According to the present invention, there is provided a process for the treatment of an oxidic material to remove one or more constituents thereof comprising establishing a fluidised bed of particles of the material in admixture with a quantity of particles of carbon in excess of that required to react with the oxygen present as bound oxygen in the constituent to be removed and as oxygen added to the bed, and passing a free chlorine containing gas having a concentration of chlorine of from 20% to 85% by volume into the fluidised bed the bed temperature being such that the chlorine will react with one or more oxides present in the oxidic material to produce one or more chlorides thereof and removing the one or more chlorides from the bed, characterised in that the quantity of chlorine introduced into the bed is controlled in relation to the expanded bed depth to maintain a zone of at least 0.25 m in depth, measured downwardly from the expanded bed surface, in which there is substantially no free chlorine. The above stated substantial absence of chlorine is taken to apply when free chlorine represents less than 0.5% preferably less than 0.4% and particularly preferably less than 0.2% by volume of the gases present in that portion of the bed. A concentration of less than 0.5% by volume of chlorine in the gases leaving the surface of the bed would be regarded by those in the art as representing substantially complete chlorine utilisation.

DETAILED DESCRIPTION OF THE PREFERRED EMBODIMENT OF THE INVENTION

The operation of a fluidised bed chlorination process within the parameters required by the present invention may be achieved by control of the input of solid material into the bed and the removal of solid material from the bed in conjunction with control of the concentration of chlorine fed to the bed as follows. Firstly, a relatively shallow bed may be established and the concentration of chlorine adjusted to give substantially no chlorine slip and, secondly, the relative solids feed and removal rates are adjusted to deepen the bed thereby providing a zone of any depth required at the top of the bed in which zone there is substantially no chlorine.

Preferably a deeper bed than that normally utilised in the art is utilised in the practice of this invention, particularly preferably a bed of more than 2.75 m in depth, for example more than 3 m in depth and up to 3.5 m in depth, or even to 4 m or 4.5 m in depth since such a bed is highly advantageous in enabling the said zone to be achieved.

Whether or not this preferred deep bed is utilised the depth of the zone in which there is substantially no chlorine is preferably at least 0.5 m for example suitably at least 0.75 m in depth measured from the expanded bed surface. The said zone may be up to 1 m or even 1.5 m or more in depth in practice.

The present process is most advantageously conducted using a particularly narrow fluidised bed reactor, for example having an aspect ratio of height to diameter of at least 3 and possibly 4 or more to 1. Preferably the ratio of height to diameter of the expanded bed itself is at least 3, particularly preferably at least 4:1, and may be, for example, very suitably, at least 5:1. Preferably a continuous feed of oxidic material is fed to one end of the bed and there is a continuous removal of solids from the opposite end of the bed to the feed, the word "continuous" being taken, as it is herafter, in its practical sense not to exclude intermittent operation having the same practical effect. Under these conditions particularly when a fluidised bed reactor having a high height to diameter ratio is used, it is found that a degree of zonation develops in the bed which affects the chemistry of the present process for example, particularly, when a deep bed is used. Preferably, the feed of oxidic material is to the opposite end of the fluidised bed to that at which the chlorine is introduced into the bed and the withdrawal is at the same end as that at which the chlorine is introduced, that is to say, the oxidic material moves countercurrently to the chlorine within the bed. Under these conditions any chlorides which may be formed in the bed in the course of the reaction between the oxidic material and chlorine are presented with an excess of oxidic material before they can leave the bed and under these conditions the chlorides which have a lesser affinity for chlorine tend to be oxidised to a great extent by reaction with the oxidic material and tend to remain in the bed and those having a greater affinity for chlorine are not oxidised but tend even to be augmented in quantity by the chlorination of the oxidic material by reaction with the chlorides having the lesser affinity for chlorine.

If the opposite method of feed is used, namely a cocurrent movement of the chlorine and the oxidic material within the bed chlorides formed are contacted with a relatively low concentration of oxides, before they leave the bed. Under these conditions there may be a relatively lower conversion of the chlorides having a lesser affinity for chlorine into oxides and a relatively greater removal of such chlorides from the bed. Nevertheless, this procedure is also within the scope of the broader aspects of this invention.

In the operation of this invention the chlorine is preferably introduced into the bed in the fluidising gas and the concentration of chlorine in the gases entering the bed is preferably from 20% to 75% particularly preferably from 20% to 65% by volume. The oxygen, if any, added to the bed, which may be as part of the fluidising as, may optionally be in the form of air if the desired chlorine concentration allows, and is preferably present in less than 10%, particularly preferably less than 5% by volume of the bed gases. Preferably the excess of carbon in the bed is at least 10%, particularly preferably at least 15%, and optionally up to 50% on the above mentioned basis. This quantity of carbon may be from 15% to 50% by weight of the oxidic material and carbon. The bed temperature may be determined by the oxidic material being treated as is explained hereafter.

The present invention is particularly advantageously applicable to the treatment of aluminous materials containing iron, such as bauxite, which is preferably first dehydrated at the temperatures of about 600° C. to 1050° C. normally used in the art, since otherwise there would be a very high heat load on the chlorination reaction due to the water bound in its structure, to kaolinite, to kaoline clays and to bauxitic clays. The iron content of the mineral may be relatively high, for example up to 20% by weight or more calculated as ferric oxide. The iron content of the mineral will usually be at least 2% by weight, calculated as ferric oxide.

The type of carbon used may be of importance to enable a suitable reaction temperature to be used to avoid undesired alumina phases. If the aluminous material has, for example, a kaolinite structure there is relatively little tendency to form an undesired alumina phase at temperatures below about 1100° C. at which temperature a mullite phase may be formed. When processing a material of this type the carbon may be, for example, a petroleum coke and the temperature may be above 850° C. and up to 1100° C., being desirably controlled only to ensure that the temperature remains above the dew point of ferrous chloride in the system. If the aluminous material has a bauxitic structure there is a tendency to form undesired alpha-alumina even at temperatures below 800° C. and it may therefore not be possible to operate at above the dew point of ferrous chloride. In this case it is desirable to operate at below the melting point of ferrous chloride of about 670° C. and to enable this to be achieved, the carbon may be active carbon or a form of reactive coke derived, as described in our copending UK patent application No. 8225065, by heating a non-caking or weakly caking coal that is coal having a British Standard Crucible Swelling Number of less than $6\frac{1}{2}$ and preferably from $\frac{1}{2}$ to $3\frac{1}{2}$ (British Standard 1016 Part 12 entitled "Caking and Swelling Properties of Coal"), in the substantial absence of oxygen until its surface area is at least 3 m$^2$/g. Similar temperatures and types of carbon may be used for intermediate types of aluminous materials such as, for example, bauxitic clays. The minimum reaction temperature which is feasable with depend on the particular oxidic material being treated but will generally be at least 450° C. or 500° C.

The iron chloride vapour removed from the bed, containing a small proportion of aluminium chloride vapour, may be contacted with oxygen, to regenerate chlorine for recycle. The resulting oxide material may be pelleted for disposal as solid waste.

The solid iron-depleted material remaining in the fluidised bed may be further treated to produce a pure aluminum chloride. If the chlorination according to the invention has been a relatively low temperature chlorination, for example, at a temperature below 670° C., the remaining bed material is preferably removed from the apparatus and washed in acidified water to remove residual soluble iron, suitably on a belt filter. The resulting material is preferably further chlorinated at a temperature below about 750° C. to produce aluminum chloride vapour. If the chlorination according to the invention has been at a temperature above about 850° C., for example at 950° C., the bed material is preferably chlorinated directly at a temperature of above 850° C. to aluminium chloride.

The aluminium chloride vapour produced as above described is preferably passed for purification at a temperature below 500° C., for example from 250° C. to 500° C., through a bed of aluminium metal granules, the bed preferably being of minimum size to fulfill its object in which bed residual iron chloride reacts with aluminium metal to form aluminium chloride which is removed with the gases passing through the bed which gases are then suitably condensed as a solid product. The resulting iron-contaminated aluminium, which may be relatively small in quantity, may be included with oxidic material for treatment according to the invention thereby converting the iron content thereof to iron chlorides which are removed and enabling the aluminium content thereof to be converted to useful aluminium chloride.

The present invention may also be applied advantageously to the removal of iron from other iron-containing oxidic materials in which the Gibbs Free Energy of chlorination of one or more oxides of metals other than iron, which are capable of reacting to form volatile chlorides at the reaction temperature and are present in substantial quantity for example at least 10% by weight in the oxidic material and are desired to be retained in the oxide bed product, is less negative than that of iron oxide, preferably, at least $5 \times 4184$, particularly preferably at least $10 \times 4184$ Joules per mole of chlorine which is reacted less negative. For example, the invention may advantageously be applied to the removal of iron from tantalite or columbite to produce a product having an increased content of tantalum and/or niobium oxides or to wolframite, scheelite or other tungsten ore to produce a tungsten oxide rich product. In applying the invention to different raw materials it is, of course, necessary to have regard to the effect of characteristics of each raw material on the actual process conditions used, for example, the need to use a temperature which will not result in the presence of certain chlorides in liquid form, such as manganese, magnesium or calcium chlorides, which can cause bed agglomeration and the possible need to use a special form of carbon to achieve the required temperature.

According to a further aspect thereof the invention is also generally applicable to the separation of metal oxides, capable of forming volatile chlorides at the reaction temperature, of which oxides the Gibbs Free Energies of chlorination are different, preferably different by at least $5 \times 4184$ particularly preferably different by at least $10 \times 4184$ Joules per mole of chlorine reacting.

Such an ore may initially be sulphidic. However, sulphidic materials may be rendered suitable for use according to the invention by oxidatively roasting to convert the sulphides to oxides. Such roasting may be integrated with an ore preheating step. By such means an ore such as, for example a sulphidic copper ore containing a substantial proportion of iron may be treated according to the invention to remove substantially all of the copper from a residue containing substantially all of the iron. The Gibbs Free Energy of chlorination, measured 1000° C., in Joules per mole of chlorine reacting, of the relevant oxides are:

CuO minus $73 \times 4184$ $Fe_2O_3$ minus $43 \times 4184$ it being envisaged that the iron content of the ore would be in the ferric oxide state following an oxidative roast.

Other applications of this aspect of the present invention will be readily apparent to those in the art, the details of the reaction conditions, the procedure for carrying out the process and the method for handling the solid and gaseous reaction products being known in the art and suitably being, for example, along the lines foreshadowed above in relation to the recovery of metal values other than iron from a material, with due allowance being given for the particular chemical constitution of the material.

While the invention has been defined by reference to a fluidised bed itself comprising both a zone in which chlorine is present and a zone in which either no chlorine or a maximum allowed chlorine content is present it would still be within the spirit of the invention to divide off the upper zone for example, by baffles or the like, provided that similar conditions to those prevailing in the said fluidised bed are reproduced.

The invention is illustrated by reference to the following examples.

The ore used in these examples was a medium silica bauxite crushed to be of size below $710 \times 10^{-6}$m. In the raw state the bauxite analysed to be 52% $Al_2O_3$, 11% $Fe_2O_3$, 4.7% $SiO_2$, 1.7% $TiO_2$ with approximately 30% water of hydration. These % figures and those given below are by weight unless otherwise stated. On dehydration by heating to about 800° C. this then analysed as 74.5% $Al_2O_3$, 15.7% $Fe_2O_3$, 6.5% $SiO_2$ and 2.3% $TiO_2$ with 0.6% loss on ignition being residual moisture. The weight ratio of oxides of aluminium to iron in the feed was thus 4.7.

The carbon used in these experiments was derived from Reject Smokeless Fuel available from the National Coal Board and being Markham Coal which had been devolatilised at 400° C. This devolatilised coal was crushed to below 2 mm. It was then introduced into a furnace at 500° C., whereupon the furnace temperature fell to 170° C., and was then heated to 950° C. over 150 minutes. The resulting product had a surface area in the range 35–90 m$^2$/g over several batches produced. Markham Coal is a weakly caking coal having a British Standard Swelling No of 2 and a rank of 802.

EXAMPLE 1

(Beneficiation of bauxite by selective batch chlorination in a bed of sufficient depth to overcome chlorine slip but without a greater depth being used and not being according to the invention).

The apparatus consisted of a vertical cylindrical fused silica reactor of height 2.4 m and internal diameter 155 mm enclosed in a gas fired furnace. Gases for fluidisation and reaction entered the base of the reactor from metering equipment via a fused silica conical distributor. Products of reaction borne out in the gases passed from the upper part of the reactor along a horizontal cooling duct to a cyclone and then to a gas sampling point before disposal via a caustic scrubber to atmosphere. The reactor was arranged to allow a feed of ore and coke via an inlet at the top of the reactor and the removal of contents of the reactor via a cooled pipe and valve at the base of the reactor.

The reactor was charged with 21.25 kg of dried bauxite and 6 kg of the reactive carbon. The charge was fluidised with 54 liters/min. of nitrogen while the furnace was regulated at 650° C. and the bed was heated to 650° C. During the later stages of the heating process 10 l/min of air were substituted for part of the nitrogen. The pressure drop of the bed was 4.5 inches of mercury ($=4.5 \times 0.0338639 \times 10^5 Nm^{-2}$) and the bed was judged to be 1.3 meters deep.

Chlorine was then added in substitution for part of nitrogen at the rate initially of 16 l/min and subsequently 22 l/min the later rate representing 40% v/v of the inlet gases. The bed temperature was maintained at 595° C. to 610° C. No chlorine slip was detected past the bed. The gas analysis showed that the carbon reacted to give $CO_2$ with negligible CO being produced. Red fumes of ferric chloride were produced. After a period of time calculated to be sufficient for removal of the iron values with 5% loss of the alumina in the bed also taking place, the chlorine was switched off. Just before this, the bed commenced to slip $Cl_2$ to give a 1.8% v/v concentration of chlorine in the bed effluent gases. The pressure drop was 3.5 inches of mercury ($=3.3\times0.0338639\times10^5 Nm^{-2}$). The bed was fluidised with nitrogen alone and the furnace switched off. The cooled degassed bed was then dropped out of the reactor and the bed was washed with water to remove iron salts and sampled. The carbon was burnt off the samples which were found to be 83.0% and 83.7% $Al_2O_3$ and 7.0% and 8.1% $Fe_2O_3$, that is, the sample had an alumina to iron oxide ratio of 11.0. The remainder was silica and titania. There was no alpha-$Al_2O_3$ present in the product.

The quality of fluidisation judged from pressure drop fluctuations was good. With a bed less deep than that used in this example chlorine slip would become apparent before the chlorination reaction had finished.

EXAMPLE 2

(Beneficiation of bauxite by selective semi-continuous chlorination in a bed of greater depth then used in Example 1 and showing operation of the invention).

For this experiment the apparatus was modified by extending the gas fired furnace structure upwards and using a silica reactor of twice the previous height. To prevent excessive pressure within the base of the reactor the gas flow rates used were reduced and the apparatus run continuously so as to reduce the initial bed density. A continuous feeder comprising a variable speed motor and gearbox driving a rotary pocket valve was employed to feed equal aliquots of feed evenly over each half our of operation.

From a number of other experiments similar in nature to those exemplified here a quantity of beneficiated bauxite bed was accumulated. This material analysed to be 31.8% carbon, the remainder being beneficiate having the analysis 85.5% $Al_2O_3$, 4.5% $Fe_2O_3$, 3.7% $SiO_2$ and 3.3% $TiO_2$ and this was used as the initial charge. (This material was relatively low in silica content as a part of it had been prepared from an earlier low silica bauxite).

A total weight of 17 kg of a mixture of the beneficiated bauxite and carbon was added to the extended reactor and fluidised with 40 l/min of nitrogen whilst heating to 625° C. again using 10 l/min of air in substitution for some of the nitrogen in the final stages of heating.

The bed depth was measured by plumb bob to be 1.4 meters and the pressure drop was 3.75 inches of mercury ($=3.75\times0.0338639\times10^5 Nm^{-2}$). The quality of fluidisation, judged by pressure drop fluctuation, was satisfactory. Half hourly aliquots each of 6 kg dried bauxite and 1.5 kg reactive carbon were weighed out and feeding commenced with 16 l/min chlorine and 14 l/min nitrogen, i.e. 40% v/v $Cl_2$ concentration was used.

The feed rates of the ore to be beneficiated and of chlorine were thus ratioed, taking into account the original 10 l/min of air still being introduced, to be related to removal of the iron as ferric chloride and to loss of 5% of the alumina additionally.

After 30 minutes operation without $Cl_2$ slip was confirmed and the ore and $Cl_2$ feeds were stopped. The bed was cooled and a sample prepared as before which showed, at this stage, 80.1% $Al_2O_3$ and 8.5% $Fe_2O_3$ the remainder being $SiO_2$ and $TiO_2$ the ratio of the oxides of Al and Fe thus being 9.4. To commence the semi-continuous operation of the invention additional previously prepared material having a similar analysis was then added to the bed to increase the bed depth and this was measured by plumb bob to be 2.8 meters. The pressure drop was 6.5 inches of mercury ($=6.5\times0.0338639\times10^5 Nm^{-2}$). The quality of fluidisation, judged as before, was not as satisfactory in this very high aspect ratio bed. Feeding of ore to be beneficiated and coke aliquots and chlorine was recommended as before, and it was found possible to feed for only 20 minutes before fluidisation became irregular due to increased bed depth and then $Cl_2$ was switched off, the bed purged and a sample removed to restore the original pressure drop of 6.5 inches of mercury. This process was repeated cyclically as a semicontinuous process for many residence times of the system, representing a total of about 20 hours of operation, to ensure it had stabilised. Over such cycles the pressure drop was increased to 7.5 inches of mercury ($=7.5\times0.0338639\times10^5 Nm^{-2}$) and it was judged that the bed depth increased to 3.2 meters. There was no detectable chlorine slip during these cycles the actual chlorine concentration in the effluent gases being well below 0.2% v/v.

Operation was continued taking care to purge the bed before withdrawal at each cycle and these bed withdrawals were sampled, washed and ignited as before, two typical samples analysing at 85.2% and 82.1% $Al_2O_3$ and 4.1% and 3.8% $Fe_2O_3$ with 8.6% and 7.7% $SiO_2$ and 2.0% and 2.0% $TiO_2$ being present. The iron chloride containing gases issuing from the bed were then suitable for further treatment according to some or all of the remaining teaching of European Patent Publication No. 0034434 referred to above.

The ratio of $Al_2O_3$ to $Fe_2O_3$ in the product was thus 21.2. There was no alpha-$Al_2O_3$ present in the product.

At the end of the run the bed was cooled as before and the bulk bed as sampled analysed at 84.0% $Al_2O_3$, 6.5% $Fe_2O_3$, or a ratio of Al to Fe of 12.9, indicating that some zonation had taken place. This material was set aside.

EXAMPLE 3

(Total chlorination of the beneficiated bauxite—to illustrate the production of $AlCl_3$ from the product of this invention.

In an initial experiment a mixture of 15 kg of washed and dried beneficiated bauxite, prepared as in Example 2, and an excess of carbon was contacted at 610° C. with 35% $Cl_2$ v/v at a total flow rate of 63 l/min. $Cl_2$ slip was measured to be 3% to 4% only.

A sample of straw coloured aluminium chloride was obtained from the cooling tube having a $Al_2O_3$ to $Fe_2O_3$ ratio of 19:1. The bed at the end of the experiment contained no alpha-$Al_2O_3$.

The temperature at the base of the reactor was allowed to rise to 730° C. The bed which continued to be chlorinated for several hours, fresh material being added to the top of the reactor.

At the end of the run a sample of the bed after ignition to remove carbon analysed at 86.4% $Al_2O_3$, 4.0% $Fe_2O_3$, 6.6% $SiO_2$ and 1.2% $TiO_2$ indicating that this bed was chlorinating without changing composition. The ratio of $Al_2O_3$ to $Fe_2O_3$ was 21.6.

EXAMPLE 4

(Purification of aluminium chloride illustrating the feasibility of producing aluminium chloride of high purity from the product of this invention). An apparatus was constructed consisting of a heated flask with means for adding anhydrous salt mixtures to it, leading to a silica tube of 1.5 inches ($=0.038$ m) diameter mounted vertically in a tube furnace and containing a bed of pellets of aluminium of approximately ⅜ inches (=0.009 m) diameter the arrangement being such that vapor from the flask is passed through the bed. Both the flask and the furnace were fitted with thermocouples and temperature regulators. The bed of pellets was regulated to a temperature of 450°–485° C. and the flask to 310°–315° C. The depth of the bed of pellets was 47 cm.

A mixture of 145 g of anhydrous $AlCl_3$ and 5 g of anhydrous $FeCl_3$ was made up and fed over a period o 80 minutes as evenly as possible into the flask on a ratio of $Al_2O_3$ to $Fe_2O_3$ of 22.5.

Aluminium chloride was collected in an air cooled collector above the pellet bed and periodically discharged. Samples collected in this period of operation were analysed and found to contain less than 0.01% Fe in $AlCl_3$, and were white in colour. This ratio expressed as alumina to iron oxide was thus greater than 2600:1 in these cases.

A mixture of 50% $AlCl_3$ and 50% $FeCl_3$ was then fed to the flask and for a period of one hour samples were collected which analysed at 0.04% Fe, 0.04% Fe, and 0.65% Fe which last sample was heavily discloured signifying the end of the run.

The pellets at the base of the bed contained Fe in Al. Some of the pellets had melted forming a pool in the base of the device, richer in iron which vapour from the flask first contacted.

At the end of the run the pellets and the solidified pool material were stored in readiness for feeding as part of the feed to a beneficiation run with dehydrated bauxite and coke, generally as in Example 2 herein.

I claim:

1. A process for the treatment of a mineral containing metal oxides capable of reacting to form volatile chlorides at temperatures of from 450° C. to 1100° C., the Gibbs Free Energy of Chlorination of at least one of the metal oxides being at least $5 \times 4184$ Joules per mole of chlorine reacted different from at least one other of the metal oxides, to remove therefrom at least one metal oxide, comprising establishing a fluidised bed of particles of the mineral in admixture with a quantity of particles of carbon in excess of that required to react with the oxygen present in the at least one metal oxide to be removed and as oxygen added to the bed, maintaining the temperature of the fluidised bed at from 450° C. to 1100° C. and such that the at least one metal oxide to be removed reacts to form a volatile chloride, passing a free chlorine containing gas having a concentration of chlorine of from 20% to 85% by volume into the fluidised bed, passing a feed of oxidic mineral into and through the fluidised bed and removing treated solids from the fluidised bed, maintaining an expanded bed depth greater than 2.75 m and an expanded bed height to diameter ratio of at least 4:1 and maintaining a zone of at least 0.25 m in depth, measured downwardly from the expanded bed surface, in which there is substantially no free chlorine and removing the volatile chloride formed from the fluidised bed.

2. A process as claimed in claim 1 wherein the depth of the said zone is at least 1 m.

3. A process as claimed in claim 1 wherein the mineral and the chlorine are introduced to the fluidised bed so as to achieve a countercurrent flow of mineral and of chlorine within the bed.

4. A process as claimed in claim 3 wherein the expanded bed depth is greater than 3 m.

5. A process as claimed in claim 1 wherein the mineral is an iron oxide-containing mineral also containing one or more other oxides the Gibbs Free Energy of chlorination of which is at least $10 \times 4184$ Joules per mole of chlorine reacted less negative than that of iron oxide, the iron oxide being converted to iron chloride and removed from the bed and wherein the iron chloride is oxidised to regenerate chlorine for re-use to treat further mineral.

6. A process as claimed in claim 5 wherein the iron-containing mineral contains oxides of aluminium, tantalum, niobium or tungsten.

7. A process as claimed in claim 6 wherein the iron-containing mineral is bauxite.

8. A process as claimed in claim 7 wherein the residual bed product comprising alumina is reacted with chlorine in the presence of carbon to produce aluminium chloride which is removed from the bed.

* * * * *